(12) United States Patent
Kim et al.

(10) Patent No.: US 12,023,645 B2
(45) Date of Patent: Jul. 2, 2024

(54) MULTICHANNEL MANUFACTURING DEVICE FOR MASS PRODUCTION OF MICROSPHERES

(71) Applicant: INVENTAGE LAB. INC, Seongnam-si (KR)

(72) Inventors: Ju Hee Kim, Gyeonggi-do (KR); Hyun Suk Oh, Seoul (KR)

(73) Assignee: INVENTAGE LAB. INC., Seongnam-si (KR)

( * ) Notice: Subject to any disclaimer, the term of this patent is extended or adjusted under 35 U.S.C. 154(b) by 432 days.

(21) Appl. No.: 17/417,968

(22) PCT Filed: Jul. 28, 2020

(86) PCT No.: PCT/KR2020/009931
§ 371 (c)(1),
(2) Date: Jun. 24, 2021

(87) PCT Pub. No.: WO2021/029573
PCT Pub. Date: Feb. 18, 2021

(65) Prior Publication Data
US 2022/0072491 A1    Mar. 10, 2022

(30) Foreign Application Priority Data
Aug. 14, 2019 (KR) .................. 10-2019-0099565

(51) Int. Cl.
*B01J 2/02* (2006.01)
*B01J 13/04* (2006.01)

(52) U.S. Cl.
CPC .............. *B01J 2/02* (2013.01); *B01J 13/04* (2013.01)

(58) Field of Classification Search
CPC .................................. B01J 2/02; B01J 13/04
See application file for complete search history.

(56) References Cited

U.S. PATENT DOCUMENTS

| 2004/0184967 A1 | 9/2004 | Parng et al. |
| 2006/0014894 A1 | 1/2006 | Torii et al. |

(Continued)

FOREIGN PATENT DOCUMENTS

| CN | 104072788 A | 10/2014 |
| CN | 109310975 A | 2/2019 |

(Continued)

OTHER PUBLICATIONS

Extended European Search Report dated Aug. 24, 2022 in Application No. 20852977.6.

(Continued)

*Primary Examiner* — Farah Taufiq
(74) *Attorney, Agent, or Firm* — Sughrue Mion, PLLC (57) ABSTRACT

In the present invention, two adjacent supply lines for supplying two immiscible fluids are spirally disposed on a substrate where microchannels for microsphere production based on a droplet-based highly controlled method for mass-production of microspheres (HCMMM) are formed, and microsphere forming parts each comprising microchannels are arranged between and along the two supply lines, whereby a much larger amount of microspheres can be produced. Further, the two supply lines are disposed in a spiral configuration, and the microsphere forming parts can be disposed by branching microchannels from the two supply lines on inner and outer sides of the spiral configuration, whereby the limited space on a wafer normally having a circular shape can be maximally used to form multiple microsphere forming parts.

11 Claims, 8 Drawing Sheets

(56) References Cited

U.S. PATENT DOCUMENTS

| | | |
|---|---|---|
| 2008/0078446 A1 | 4/2008 | Fujiwara |
| 2013/0129581 A1 | 5/2013 | Nisisako |
| 2016/0271610 A1 | 9/2016 | Foulds et al. |
| 2018/0133672 A1* | 5/2018 | Kim ................ B01F 33/302 |
| 2018/0133677 A1 | 5/2018 | Kim |
| 2019/0099729 A1 | 4/2019 | Go et al. |
| 2020/0197893 A1 | 6/2020 | Kim |
| 2020/0261878 A1 | 8/2020 | Kim |

FOREIGN PATENT DOCUMENTS

| | | |
|---|---|---|
| DE | 10123092 A1 | 11/2002 |
| EP | 3372308 A1 | 9/2018 |
| JP | 2006-055770 A | 3/2006 |
| JP | 2007-160227 A | 6/2007 |
| JP | 2007160227 A * | 6/2007 |
| JP | 2012-011268 A | 1/2012 |
| KR | 10-2018-0066895 A | 6/2018 |
| WO | 02/089965 A1 | 11/2002 |

OTHER PUBLICATIONS

International Search Report for PCT/KR2020/009931 dated, Nov. 4, 2020 (PCT/ISA/210).
Chinese Office Action issued Feb. 1, 2024 in Application No. 202080008320.5.

* cited by examiner

MULTICHANNEL MANUFACTURING DEVICE FOR MASS PRODUCTION OF MICROSPHERES

TECHNICAL FIELD

The present invention relates to a multichannel microsphere producing unit for mass production.

BACKGROUND ART

The present invention relates to an apparatus and a method for mass-producing microspheres, and more particularly, to an apparatus and a method for mass-producing a monodisperse polymer-based microsphere medical product at high yield based on microfluidics which is a multidisciplinary field that deals with the behavior, precise control, and adjustment of fluids that are geometrically constrained to a small size of several tens of micrometers.

A droplet-based highly controlled method for mass-production of microspheres (HCMMM) is a rapidly growing interdisciplinary field related to a research field encompassing soft material physics and biochemistry and microsystems engineering. In addition, the droplet-based HCMMM is based on a method having the distinction of being capable of discretely adjusting volumes of fluids in immiscible phases with a low Reynolds number and a laminar flow state. Interest in droplet-based HCMMM systems has been growing substantially over the decades. A droplet-based HCMMM of the present invention, that is, mass production microfluidics, is deemed suitable for conveniently handling a very small amount of fluids, providing better mixing, and high yield experiments/mass production of a polymeric drug delivery system (DDS).

DISCLOSURE

Technical Problem

The present invention is directed to providing a multichannel microsphere producing unit for mass production which is capable of forming a larger amount of microspheres by effectively arranging a plurality of microchannels on a substrate in a highly controlled method for mass-production of microspheres (HCMMM) in which immiscible fluids are discretely supplied through a microchannel structure to form droplets and produce microspheres.

Technical Solution

According to one embodiment of the present invention, a multichannel microsphere producing unit is provided, which comprises a central plate; an upper plate disposed above the central plate; a lower plate disposed below the central plate; a first supply line, a second supply line, and a discharge line which are disposed between the central plate and the upper plate and to which a first raw material, a second raw material, and a third raw material are respectively supplied as solutions; a microsphere formation part which is disposed on an upper surface of the central plate and includes one or more first microchannels including one end portion in fluid communication with the first supply line, a second microchannel including one end portion in fluid communication with the second supply line, one or more merge points at which the other end portion of the first microchannel and the other end portion of the second microchannel are connected to be in fluid communication with each other so that droplets are formed, and one or more third microchannels which include one end portion in fluid communication with the merge point and in which the separated droplets are formed into microspheres; and the discharge line which is disposed between the central plate and the lower plate, includes a first discharge line, a second discharge line, and a plurality of microholes passing through the central plate to be in fluid communication with the other end portions of the one or more third microchannels, and is formed to collect and discharge the microspheres, wherein shapes of the first supply line, the first discharge line, the second supply line, and the second discharge line in a plan view are rolled-up shapes which are sequentially disposed in parallel so as to be spaced from each other and are wound in a plurality of turns, and the microsphere formation part is provided as a plurality of microsphere formation parts disposed along the first discharge line and the second discharge line.

Advantageous Effects

According to the present invention, two fluids, which are immiscible with each other, are supplied onto a substrate on which microchannels, which are for producing microspheres based on a droplet-based highly controlled method for mass-production of microspheres (HCMMM), are formed, two adjacent supply lines are disposed in a rolled-up shape, and microsphere formation parts including the microchannels are disposed between and along the two adjacent supply lines, thereby producing a larger amount of microspheres.

In addition, two supply lines are disposed in a rolled-up shape, and microchannels are branched off from both sides of the inside and the outside of the rolled-up shape of each supply line to arrange microsphere formation parts, thereby maximizing a limited space of a wafer generally having a circular shape and constituting the plurality of microsphere formation parts.

MODES OF THE INVENTION

Figure 1:
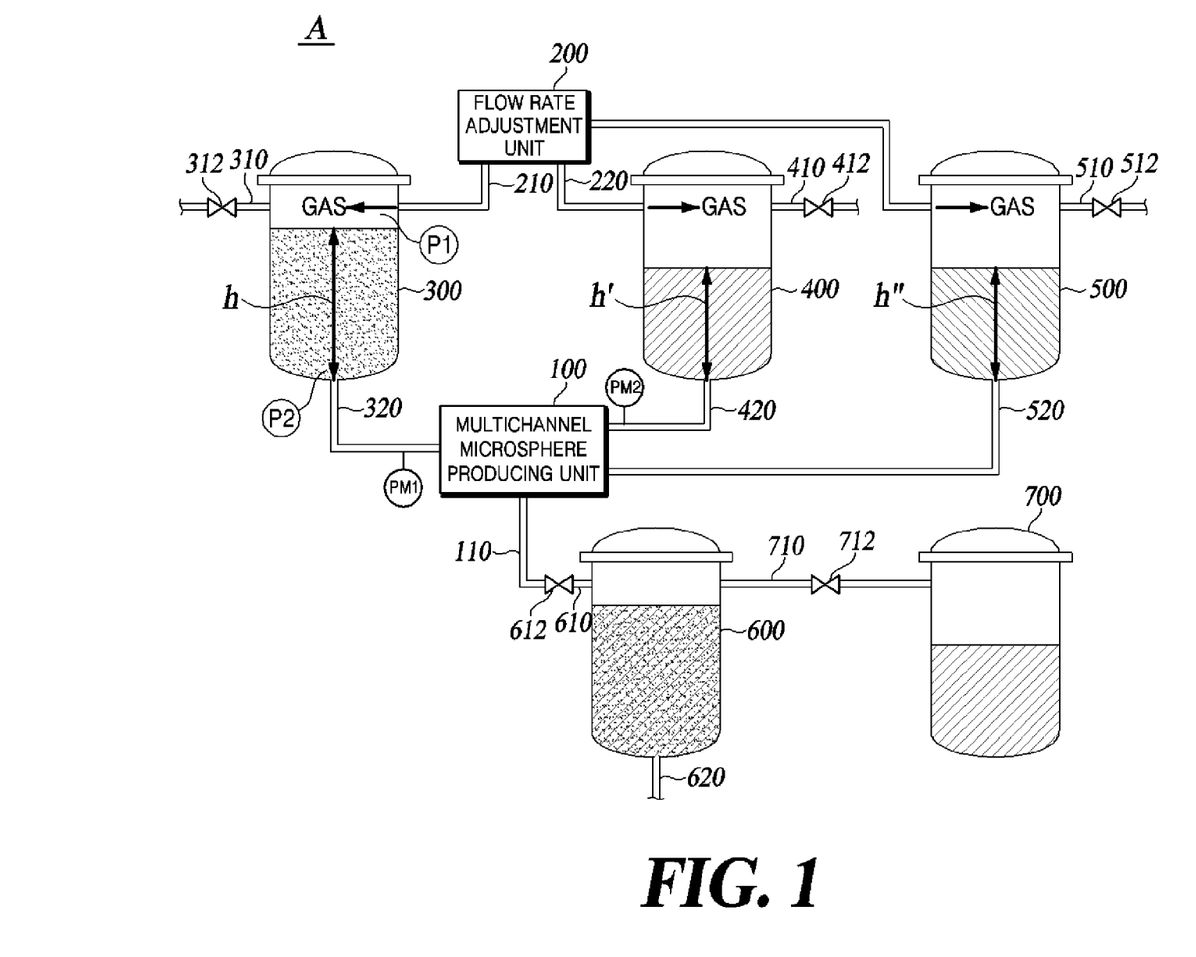
FIG. 1 is a block diagram of an apparatus for mass-producing microspheres according to one embodiment of the present invention.

FIG. 1 is a block diagram of an apparatus for mass-producing microspheres according to one embodiment of the present invention.

Referring to FIG. 1, the apparatus for mass-producing microspheres according to one embodiment of the present invention includes a multichannel microsphere producing unit 100 and further includes a first raw material storage tank 300, a second raw material storage tank 400, a third raw material storage tank 500, a flow rate adjustment unit 200, and a product storage tank 600.

The flow rate adjustment unit 200 may be controlled such that a supply pressure of raw materials supplied from the first, second, and third raw material storage tanks 300, 400, and 500 to the multichannel microsphere producing unit 100 is constant.

Figure 2:
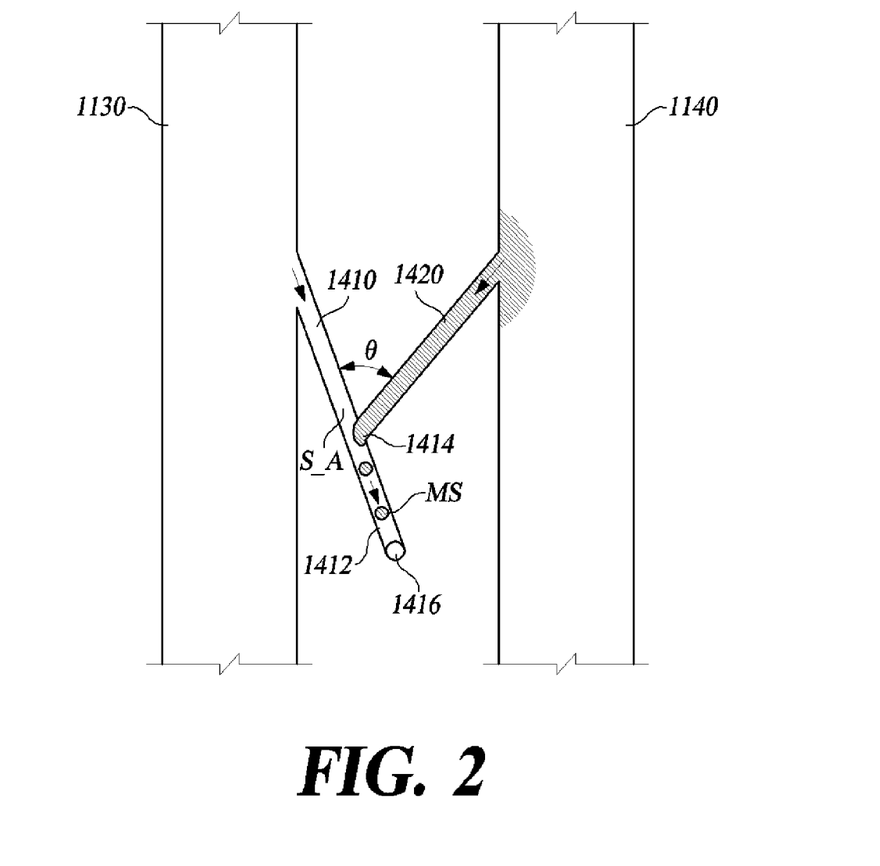
FIG. 2 is an exemplary schematic diagram illustrating a process of forming microspheres in a microsphere formation part which is a base unit of the apparatus for mass-producing microspheres according to one embodiment of the present invention.

FIG. 2 is an exemplary schematic diagram illustrating a process of forming microspheres in a microsphere formation part which is a base unit of the apparatus for mass-producing microspheres according to one embodiment of the present invention.

FIG. 2 is an enlarged diagram of one channel for forming microspheres, and for convenience of description, a size of each of the components is exaggerated and enlarged or reduced.

In one embodiment of the present invention, a first microchannel 1410 may be connected to a first supply line 1130. The first supply line 1130 may supply a water-phase solution, in which a first raw material, for example, a surfactant such as polyvinyl alcohol (PVA), is dissolved, to the first microchannel 1410. A second microchannel 1420 may be connected to a second supply line 1140. The second supply line 1140 may include an oil-phase solution in which a second raw material, for example, a biodegradable material, is dissolved, wherein the biodegradable material is at least one selected from the group consisting of polylactide (PLA), polylactide-co-glycolide (PLGA), polycaprolactone (PCL), and a combination thereof.

The second raw material having a hydrophobic surface may be introduced into the first raw material having a hydrophilic surface from the second microchannel 1420 at a merge point 1414. As an amount of the introduced second raw material at the merge point 1414 is increased, a flow pressure of the first raw material acting on the introduced second raw material may be increased. As a result, at the merge point 1414, the second raw material may be separated from the second raw material supplied through the second microchannel 1420 and may flow downward in a droplet form in a third microchannel 1412 together with the first raw material having a relatively large flow rate. In addition, the second microchannel 1420 into which a dispersed phase is injected and the first microchannel 1410 in which two continuous phases are symmetrical may be formed at the merge point, and microspheres may be formed due to a flow pressure of the two phases.

While the second raw material flows downward, an isotropic external force may act on droplets of the hydrophobic second raw material within the hydrophilic first raw material, and thus, the droplets of the second raw material can maintain a shape close to a sphere. The droplets which maintain a spherical shape may harden over time, thereby forming microspheres.

A third raw material has characteristics that are the same as or similar to characteristics of the first raw material and serves to transfer the formed microspheres to a outlet 110 to safely transfer the formed microspheres to the product storage tank 600.

Figure 3:
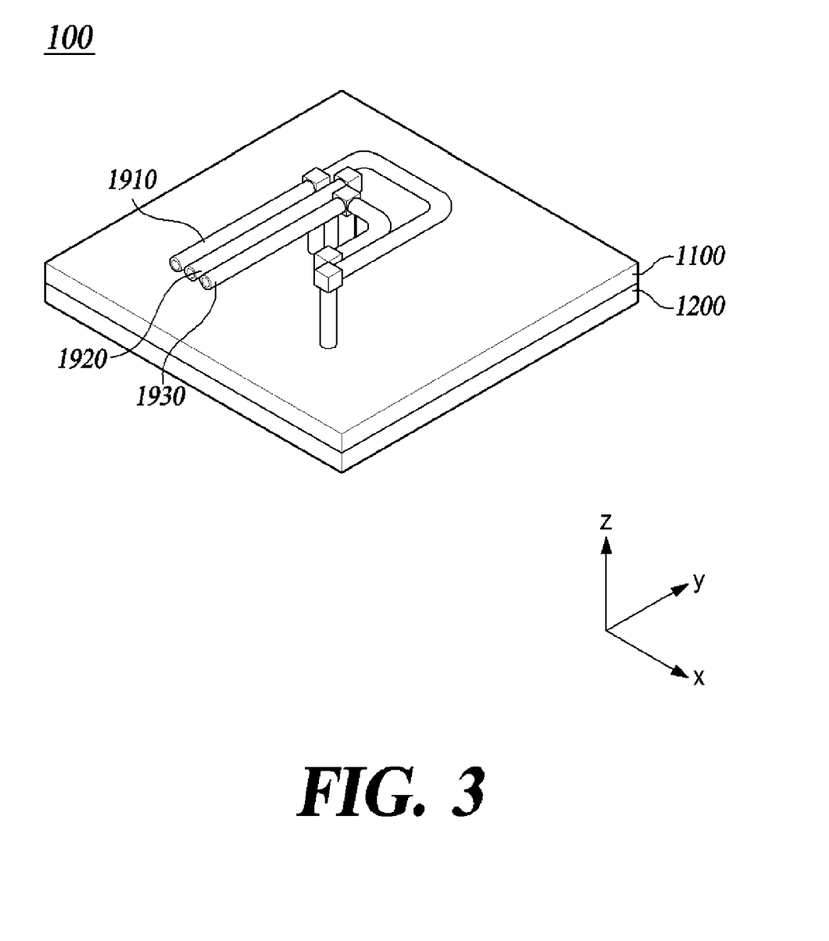
FIG. 3 is an assembled perspective diagram of a multichannel microsphere producing unit of the apparatus for mass-producing microspheres according to one embodiment of the present invention.

FIG. 3 is an assembled perspective diagram of the multichannel microsphere producing unit of the apparatus for mass-producing microspheres according to one embodiment of the present invention.

Figure 4:
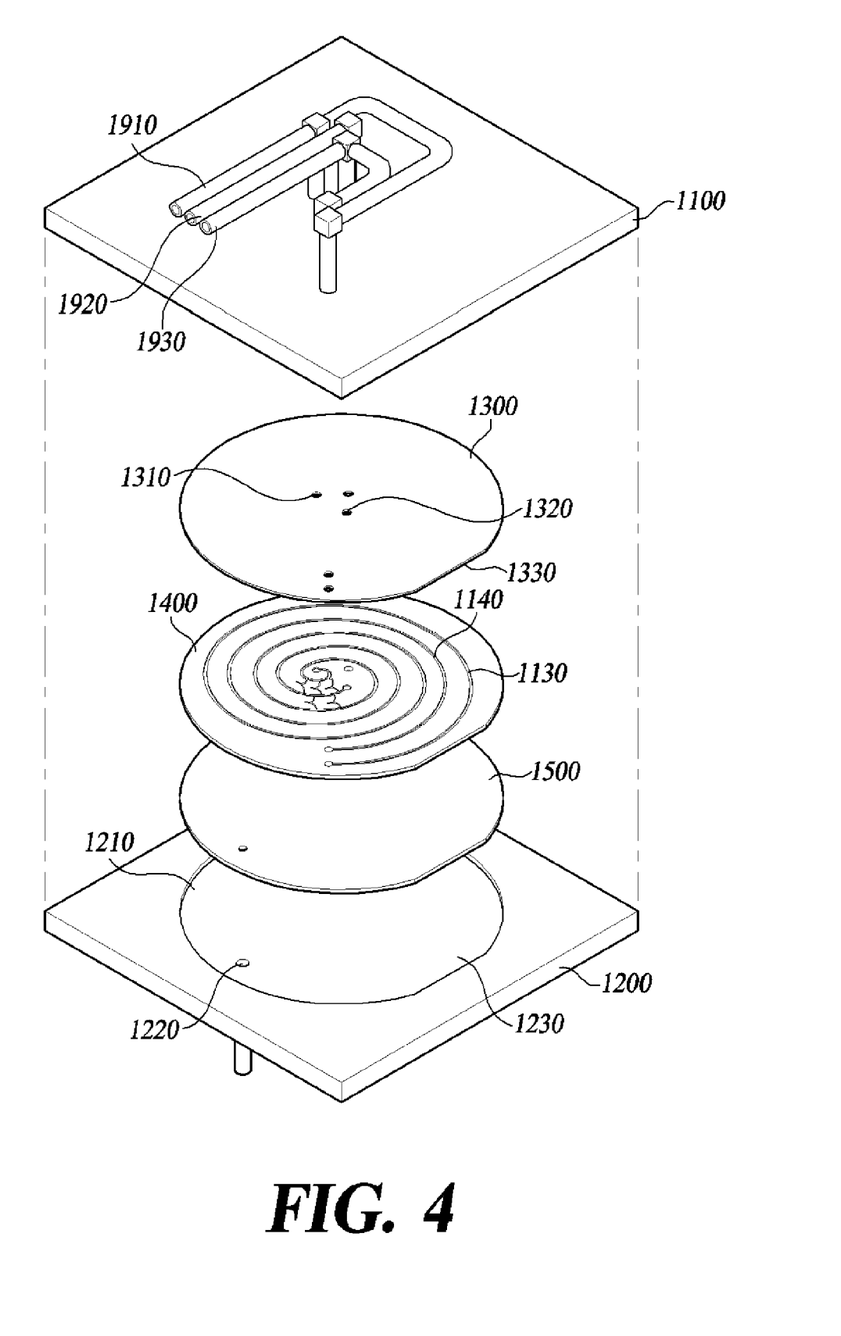
FIG. 4 is an exploded perspective diagram of the multichannel microsphere producing unit of FIG. 3.

FIG. 4 is an exploded perspective diagram of the multichannel microsphere producing unit of FIG. 3.

Figure 5:
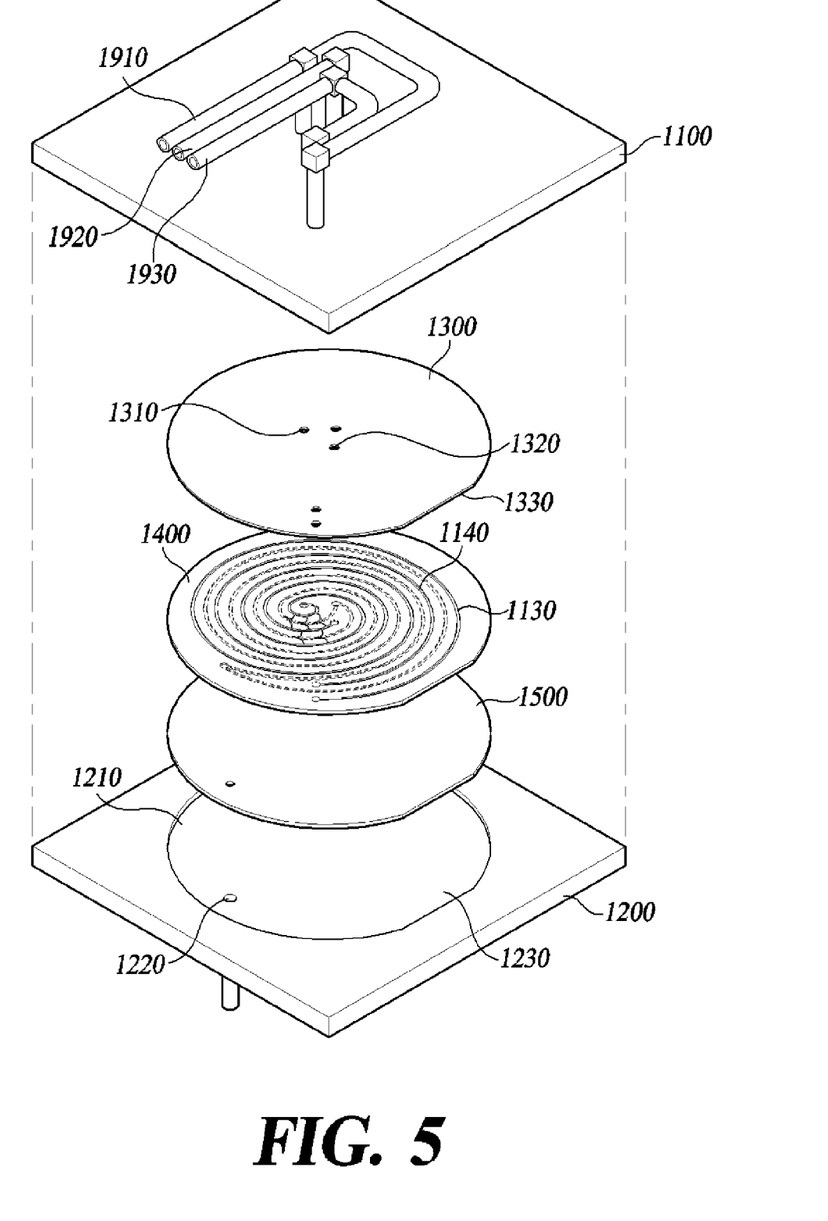
FIG. 5 is an exploded perspective diagram of the multichannel microsphere producing unit of FIG. 3.

FIG. 5 is an exploded perspective diagram of the multichannel microsphere producing unit of FIG. 3.

Figure 6:
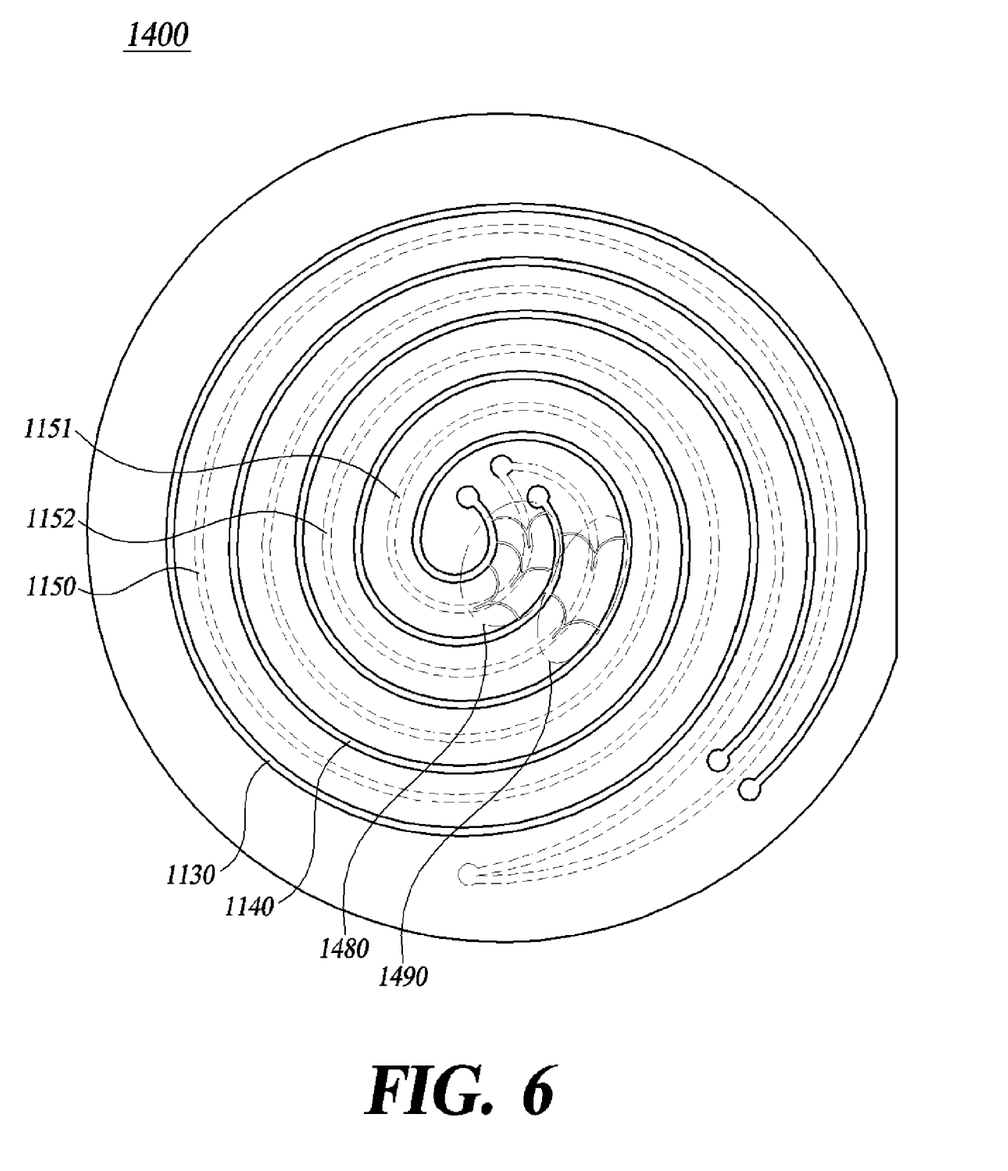
FIG. 6 is a top perspective diagram of a central plate of the multichannel microsphere producing unit of FIG. 3.

FIG. 6 is a top perspective diagram of a central plate of the multichannel microsphere producing unit of FIG. 3.

Referring to FIGS. 3 to 6, the multichannel microsphere producing unit 100 of the apparatus for mass-producing microspheres according to one embodiment of the present invention includes an upper case 1100, a lower case 1200, an upper plate 1300, a central plate 1400, a lower plate 1500, and a product discharge portion. A plurality of O-rings (not shown) may be inserted and installed between a lower surface of the upper case 1100 connected to a raw material inlet and the upper plate 1300 and between an upper surface of the lower case 1200 and a lower surface of the lower plate 1500.

The multichannel microsphere producing unit 100 according to one embodiment of the present invention is characterized in that the first supply line 1130, the second supply line 1140, a discharge line 1150, a first microsphere formation part array 1480, and a second microsphere formation part array 1490 have a rolled-up shape.

According to one embodiment, the first supply line 1130, the second supply line 1140, the first microsphere formation part array 1480, and the second microsphere formation part array 1490 are disposed on an upper surface of the central plate 1400, and the discharge line 1150 is disposed on a lower surface or rear surface of the central plate 1400. For convenience, the discharge line 1150 may be understood as including a first discharge line 1151 and a second discharge line 1152. Shapes of the components on the central plate 1400 in a plan view may be rolled-up shapes in which the first supply line 1130, the first discharge line 1151, the second supply line 1140, and the second discharge line 1152 are sequentially disposed in parallel so as to be spaced from each other. That is, the first supply line 1130 is again positioned outside the rolled-up shape of the second discharge line 1152.

Since the supply lines 1130 and 1140 and the discharge line 1150 have configurations that are formed in a rolled-up shape and are repeatedly disposed, the first supply line 1130 and the second supply line 1140 disposed on the upper surface of the central plate 1400 are laterally and alternately disposed in the length direction thereof. The microsphere formation part may be arranged along a spiral path between the first supply line 1130 and the second supply line 1140 to form the microsphere formation part arrays 1480 and 1490.

The microsphere formation part according to one embodiment may constitute the first microsphere formation part array 1480 disposed on the upper surface of the central plate 1400 and arranged along the first discharge line 1151 in parallel on the lower surface of the central plate 1400 and the second microsphere formation part array 1490 disposed on the upper surface of the central plate 1400 and arranged along the second discharge line 1152 in parallel on the rear surface of the central plate 1400.

The microsphere formation part may include the first microchannel 1410 through which the first raw material is introduced, the second microchannel 1420 through which the second raw material is introduced, and the third microchannel 1412 connected to an outlet of the microsphere formation part. Here, the first microchannel 1410 and the second microchannel 1420 may be merged so as to be in fluid communication with each other at the merge point 1414, and a channel from the merge point 1414 to a microhole 1416 through which microspheres are discharged may be referred to as the third microchannel 1412. The microhole 1416 may pass through the central plate 1400 and may be in fluid communication with the discharge line 1150 on the lower surface or rear surface of the central plate 1400. Thus, microspheres, which are separated from the merge point 1414 in a droplet form and then are formed in a spherical shape by passing through the third microchannel 1412, may be transferred to the discharge line 1150.

In addition, it is preferable that each of the first, second, and third microchannels 1410, 1420, and 1412 of the microsphere formation part is formed to have a cross-sectional area that is in a range of 100% to 200% of a cross-sectional area of each of microspheres. Alternatively, each of the first, second, and third microchannels 1410, 1420, and 1412 of the microsphere formation part may have a cross section of any one of a circular shape and a square shape of which a width and a depth are the same. The width of the square shape or a diameter of the circular shape may be formed in a range of 100% to 200% of a diameter of formed microspheres.

In the present invention, a water-phase solution flows into the microsphere formation part through the first microchannel 1410 to form a flow in each of the microchannels and thus meets a flow of a biodegradable polymer-phase solution at an angle of 30° to 90° at the merge point 1414. Here, due to the flow of the water-phase solution, microsphere droplets are formed due to the flow of the biodegradable polymer solution being segmented and due to the two solutions being immiscible with each other. In addition, the second microchannel 1420 into which a dispersed phase is injected and the first microchannel 1410 in which two continuous phases are symmetrical are formed at the merge point 1414, and microspheres may be formed due to a flow pressure of the two phases. As a result, a dispersed phase solution is formed, and microsphere droplets formed at the merge point 1414 are moved to the discharge line 1150 through the third microchannel 1412. A solution including biodegradable polymer-based microsphere droplets will be referred to as a dispersed phase solution below.

It has been experimentally confirmed that, when a water-phase solution enters each microsphere formation part through the first microchannel to form a flow in each of the microchannels and thus meet a flow of a biodegradable polymer-phase solution at an angle of 30° or less or 90° or more, a size distribution of formed microsphere droplets is increased, that is, polydisperse microsphere droplets are formed. Therefore, in order to secure quality related to microsphere droplets with a narrow size distribution, i.e., a size distribution of the microsphere droplets, an angle of a portion, at which a water-phase solution flows to be merged with a biodegradable polymer solution, i.e., θ, should be set to an angle of 30° to 90°.

Each of the first and second supply lines 1130 and 1140 and the discharge line 1150 according to one embodiment may be formed to have a sufficiently large cross-sectional area and volume as compared with each of the microchannels and may be formed to maintain a constant pressure. In addition, the first and second supply lines 1130 and 1140 and the discharge line 1150 may have different pressures. A pressure difference between the first supply line 1130 and the second supply line 1140 may be determined such that droplets in the microsphere formation part have a desired size. A pressure difference between the first and second supply lines 1130 and 1140 and the discharge line 1150 may determine a moving speed of microspheres formed in the microsphere formation part, for example, a moving speed of the first raw material surrounding the microspheres. That is, the pressures of the first and second supply lines 1130 and 1140 and the discharge line 1150 may be selected in order to determine the size, formation period, and moving speed of the microspheres.

Typically, a microsphere formation part, which includes microchannels having a geometric cross-sectional size of several tens to several hundreds of micrometers, is produced through a semiconductor process or the like, and a wafer may be used for highly required precision and process convenience. Such a wafer has a basic shape of a disk, and the present invention has an advantage in that microsphere formation parts may be disposed at a high degree of integration by implementing a rolled-up arrangement from a central portion to a peripheral portion of a disk shape.

Just for comparison, for example, when the microsphere formation parts are disposed radially around a center of the disk shape, in a direction toward the center, it may be difficult to secure a gap between adjacent elements. Thus, a wasted area may inevitably be generated at the peripheral portion of the disk shape. On the other hand, in the case of the present invention, the two supply lines 1130 and 1140 and the two discharge lines 1151 and 1152 are alternately disposed in parallel on different surfaces so as to be spaced apart from each other and are formed to have a rolled-up shape. Thus, a plurality of microsphere formation parts each including two or more input microchannels and one output microchannel may be efficiently disposed on the central plate 1400 having a disk shape.

In the case of one embodiment, except for innermost and outermost sides of the rolled-up shape, the two supply lines 1130 and 1140 may be repeatedly disposed, and microchannels may be connected to both left and right sides of each of the supply lines 130 and 1140 in the length direction thereof. That is, due to a rolled-up arrangement, substantially twice as many microsphere formation parts may be disposed on the central plate 1400 with respect to one pair of supply lines 1130 and 1140.

The central plate 1400 may be made of a rigid material that is moldable with high dimensional accuracy, for example, a silicon wafer, a glass wafer, polydimethylsiloxane (PDMS), or an engineering plastic. In particular, in one embodiment of the present invention, the central plate 1400 may be made of a crystalline or amorphous silicon wafer. In one embodiment of the present invention, the microchannels need to have high dimensional accuracy and thus may be suitably made of a silicon wafer.

The microsphere formation part including the microchannels of the present invention may be formed using a deep reactive ion etching (DRIE) method, i.e., a method of vertically etching a silicon wafer and anodically bonding glass onto the silicon wafer. Since the DRIE method enables vertical etching and provides a smooth surface when etching to a depth of 50 μm or more is required, the DRIE method is more suitable for forming microchannels than a wet etching method. Although it has been described that the microchannels of the present invention are formed on a silicon wafer, the microchannels can also be formed on a glass wafer, a steel wafer, or a hydrophobic polymer wafer such as PDMS. For example, using such specific polymer surfaces has several advantages. First, a hydrophobic polymer wafer is completely bioinert and has an antifouling property and is ideally suitable for biopharmaceutical processing and manufacturing. A wafer chip itself is relatively inexpensive and completely disposable. Most importantly, the hydrophobic polymer wafer enables establishment of conditions under which a flow is segmented with a high level of stability and reliability, thereby enabling mass production of microspheres.

Referring again to FIG. 1, the first raw material storage tank 300 may include the first raw material which is a water-phase solution. The first raw material may include purified water and a surfactant dissolved therein. For example, the first raw material may be a water-phase solution in which PVA with a molecular weight of 8,500 to 124,000 is dissolved in purified water at 0.25 wt % as a surfactant.

The first raw material is sterilized through a sterilization process, for example, by passing through a sterilization filtration filter. The filtered first raw material may be introduced into the first raw material storage tank 300 through a first raw material inlet 310. After the sterilized first raw material is sufficiently or completely introduced into the first raw material storage tank 300, a first raw material inlet valve 312 installed in the first raw material inlet 310 is closed. Accordingly, the first raw material storage tank 300 may be isolated from the outside and may maintain a sterilized state.

The second raw material storage tank 400 may include the second raw material which is an oil-phase solution. The second raw material may include an organic solvent and a biodegradable polymer and a long-acting drug which are dissolved therein. For example, the organic solvent of the second raw material may be tetrahydrofuran, dichloromethane, chloroform, ethyl acetate, hexafluoroisopropanol, or acetone, and the biodegradable polymer may include an oil-phase solution in which a combination of the long-acting drug and PLA, PLGA, or PCL is dissolved.

The second raw material is sterilized through a sterilization process, for example, by passing through a sterilization filtration filter. The sterilized second raw material is introduced into the second raw material storage tank 400 through a second raw material inlet 410. After the sterilized second raw material is sufficiently or completely introduced into the second raw material storage tank 400, a second raw material inlet valve 412 installed in the second raw material inlet 410 is closed. Accordingly, the second raw material storage tank 400 may be isolated from the outside and may maintain a sterilized state.

The first raw material stored in the first raw material storage tank 300 and the second raw material stored in the second raw material storage tank 400 may be transferred to the multichannel microsphere producing unit 100 through a first raw material outlet 320 and a second raw material outlet 420, respectively.

The flow rate adjustment unit 200 may be in fluid communication with the first raw material storage tank 300 through a first flow rate adjustment line 210, may be in fluid communication with the second raw material storage tank 400 through a second flow rate adjustment line 220 and may be in fluid communication with the third raw material storage tank 500 through a third flow rate adjustment line. The flow rate adjustment unit 200 is basically formed to finely control a flow rate (and a flow velocity) with a flow pump between the raw material storage tank and the multichannel microsphere producing unit 100.

In addition, the flow rate adjustment unit 200 may introduce a first gas having a first raw material flow rate into the first raw material storage tank 300, introduce a second gas having a second raw material flow rate into the second raw material storage tank 400, and introduce a third gas having a third raw material flow rate into the third raw material storage tank 500. The first gas, the second gas, and the third gas may be substantially the same type of gas and may be, for example, air or an inert gas.

The first raw material stored in the first raw material storage tank 300 may be transferred to the multichannel microsphere producing unit 100 in an amount corresponding to the first raw material flow rate of the introduced first gas. Similarly, the second raw material stored in the second raw material storage tank 400 may be transferred to the multichannel microsphere producing unit 100 in an amount corresponding to the second raw material flow rate of the introduced second gas. The third raw material stored in the third raw material storage tank 500 may be transferred to the multichannel microsphere producing unit 100 in an amount corresponding to the third raw material flow rate of the introduced third gas.

A pressure P2 of the first raw material outlet 320 of the first raw material storage tank 300 may be represented by the following equation.

$$P2 = P1 + \rho g h \qquad \text{[Equation 1]}$$

Here, P1 refers to a pressure of the first gas introduced into the first raw material storage tank 300, $\rho$ refers to a density of the first raw material, g refers to the acceleration of gravity, and h refers to a height to an upper surface of the first raw material from the first raw material outlet 320. That is, the pressure P2 of the first raw material outlet 320 may be represented by the sum of a pressure of a gas layer at an upper side of the first raw material storage tank 300 or the pressure P1 of the first gas to be introduced and a hydrostatic pressure of the first raw material in the first raw material outlet 320.

In an incompressible fluid constituting a closed system, for example, in a liquid such as water or an organic solvent, an introduced flow rate and a discharged flow rate thereof are known to be the same. A flow rate inside the closed system depends on a pressure difference or pressure gradient between an introduction part and a discharge part of the closed system In one embodiment of the present invention, since the multichannel microsphere producing unit 100 maintains airtightness except for an inlet and an outlet thereof, the multichannel microsphere producing unit 100 may be construed as a closed system. In addition, in one embodiment of the present invention, a constant pressure, for example, atmospheric pressure, can be maintained in the outlet of the multichannel microsphere producing unit 100. Accordingly, the pressure P2 of the first raw material outlet 320 for transferring a raw material to the multichannel microsphere producing unit 100 and a pressure of the second raw material outlet 420 of the second raw material storage tank 400 may be maintained constant, and a flow rate of a fluid flowing through the multichannel microsphere producing unit 100 may also be maintained constant.

When microspheres are produced using the apparatus according to one embodiment of the present invention, the first raw material inlet 310 is closed by the first raw material inlet valve 312, and the first raw material storage tank 300 is in fluid communication only with the first flow rate adjustment line 210 and the first raw material outlet 320. Thus, a flow rate of the first raw material flowing through the first raw material outlet 320 corresponds to a flow rate of the first gas introduced into the first raw material storage tank 300.

In one embodiment of the present invention, the flow rate adjustment unit 200 may introduce the first gas into the gas layer at the upper side of a first material storage tank through the first flow rate adjustment line 210. The gas layer at the upper side of the first raw material storage tank may have a volume greater than a flow rate of the introduced first gas. Thus, a pressure fluctuation of the introduced first gas may be leveled off or attenuated in the entire gas layer at the upper side of the first raw material storage tank. Therefore, the gas layer at the upper side may press down on a surface of the first raw material with a uniform pressure without a pressure fluctuation, and the pressure P2 of the first raw material outlet 320 and a flow rate discharged through the first raw material outlet 320 may be maintained constant without fluctuating.

In addition, a flow rate of the first gas supplied to the first raw material storage tank 300 may be maintained constant using the flow rate adjustment unit 200, thereby constantly maintaining a flow rate of the first raw material discharged from the first raw material storage tank 300, that is, transferred to the multichannel microsphere producing unit 100. In addition, the gas layer, for example, a gas buffer layer may be formed at the upper side of the first raw material storage tank 300, and the flow rate adjustment unit 200 may supply the first gas to the gas layer through the first flow rate adjustment line 210 so that a flow rate of the first raw material transferred to the multichannel microsphere producing unit 100 can be smoothly maintained without fluctuating. A flow rate adjusting method of the second raw material storage tank 400 and the third raw material storage tank 500 may also be the same as a flow rate adjusting method of the first raw material storage tank 300.

A large number of parameters need to be controlled in order to achieve the required objective, and it has been determined through experiments by the inventor(s) that critical/important parameters are a flow rate of introduced flows, a viscosity of the introduced flows, a surfactant concentration in one of the introduced flows, a biodegradable polymer concentration in another introduced flow, channel wall wettability, and a channel dimension, and among the described critical/important parameters, the channel wall wettability is determinable by setting materials to be used in a microchip and solutions flowing through microchannels to form microsphere droplets, the viscosity is determinable by determining each of concentrations of fluids and a biodegradable polymer and a surfactant included in the fluids, and only introduced flow rates, that is, the flow rate of the introduced flows including a biodegradable polymer, the flow rate of the introduced flow(s) including a surfactant, the channel dimension, the biodegradable polymer concentration, and the surfactant concentration in each of the introduced flows are left as variables.

In an assembled state, the upper case 1100 and the lower case 1200 may be coupled to each other. The upper plate 1300, the central plate 1400, and the lower plate 1500 may be disposed between the upper case 1100 and the lower case 1200. The upper case 1100 and the lower case 1200 may be made of a corrosion-resistant material, for example, stainless steel or a rigid plastic. Although not shown, the upper case 1100 and the lower case 1200 may be coupled to each other through a coupling part such as a bolt. However, the present invention is not limited thereto. In some embodiments, the upper case 1100 and the lower case 1200 may be coupled to each other through a fastening part such as a clamp, or adhesion using an adhesive or welding.

The upper case 1100 and the lower case 1200 may have the same shape. In the illustrated embodiment, the upper case 1100 and the lower case 1200 are rectangular plane plates. However, the present invention is not limited thereto. The upper case 1100 and the lower case 1200 may have any shape such as a disk shape such that the upper plate 1300, the central plate 1400, and the lower plate 1500 may be properly disposed therebetween. For example, the upper case 1100 and the lower case 1200 may have a disk shape.

The upper case 1100 may include a first introduction pipe 1910, a second introduction pipe 1920, and a third introduction pipe 1930. The first introduction pipe 1910, the second introduction pipe 1920, and the third introduction pipe 1930 may be disposed on an upper surface of the upper case 1100.

One end portion of the first introduction pipe 1910 may be in fluid communication with the first raw material outlet 320 of the first raw material storage tank 300, and the other end portion thereof may pass through the upper case 1100 to be in fluid communication with a connection hole of the first supply line 1130. The first raw material may be supplied from the outside of the multichannel microsphere producing unit 100 through the first introduction pipe 1910, and the first raw material may be transferred to the first supply line 1130 on the lower surface of the upper case 1100.

One end portion of the second introduction pipe 1920 may be in fluid communication with the second raw material outlet 420 of the second raw material storage tank 400, and the other end portion thereof may pass through the upper case 1100 to be in fluid contact with the second supply line 1140. The second raw material may be supplied from the outside of the multichannel microsphere producing unit 100 through the second introduction pipe 1920, and the second raw material may be transferred to the second supply line 1140 on the lower surface of the upper case 1100.

One end portion of the third introduction pipe 1930 may be in fluid communication with a third raw material outlet 520 of the third raw material storage tank 500, and the other end portion thereof may pass through the upper case 1100 to be in fluid communication with the discharge line 1150. The third raw material may be supplied from the outside of the multichannel microsphere producing unit 100 through the third introduction pipe 1930, and the third raw material may be transferred to the discharge line 1150 on the lower surface of the upper case 1100.

In the illustrated embodiment of the present invention, an example has been described in which the first introduction pipe 1910 and the second introduction pipe 1920 are branched off from the upper case 1100 so that each of two lines is connected to the first supply line 1130 or the second supply line 1140. However, the present invention is not limited thereto. In other embodiments, the first introduction pipe 1910 and the second introduction pipe 1920 may not be branched off and may each be connected to only one port or may be branched off into three or more lines and connected to the first supply line 1130 or the second supply line 1140.

Referring again to FIG. 2, the multichannel microsphere producing unit 100 of the apparatus according to one embodiment of the present invention receives the first raw material from the first raw material storage tank 300 and receives the second raw material from the second raw material storage tank 400. The multichannel microsphere producing unit 100 may include a plurality of microchannels through which the first raw material and the second raw material flow. Based on a principle described with reference to FIG. 2, microspheres are formed through an interaction when the first raw material and the second raw material flowing through the microchannels are combined at the merge point 1414. In addition, the second microchannel 1420 into which a dispersed phase is injected and the first microchannel 1410 in which two continuous phases are symmetrical may be formed at the merge point, and microspheres may be formed due to a flow pressure of the two phases.

Figure 7:
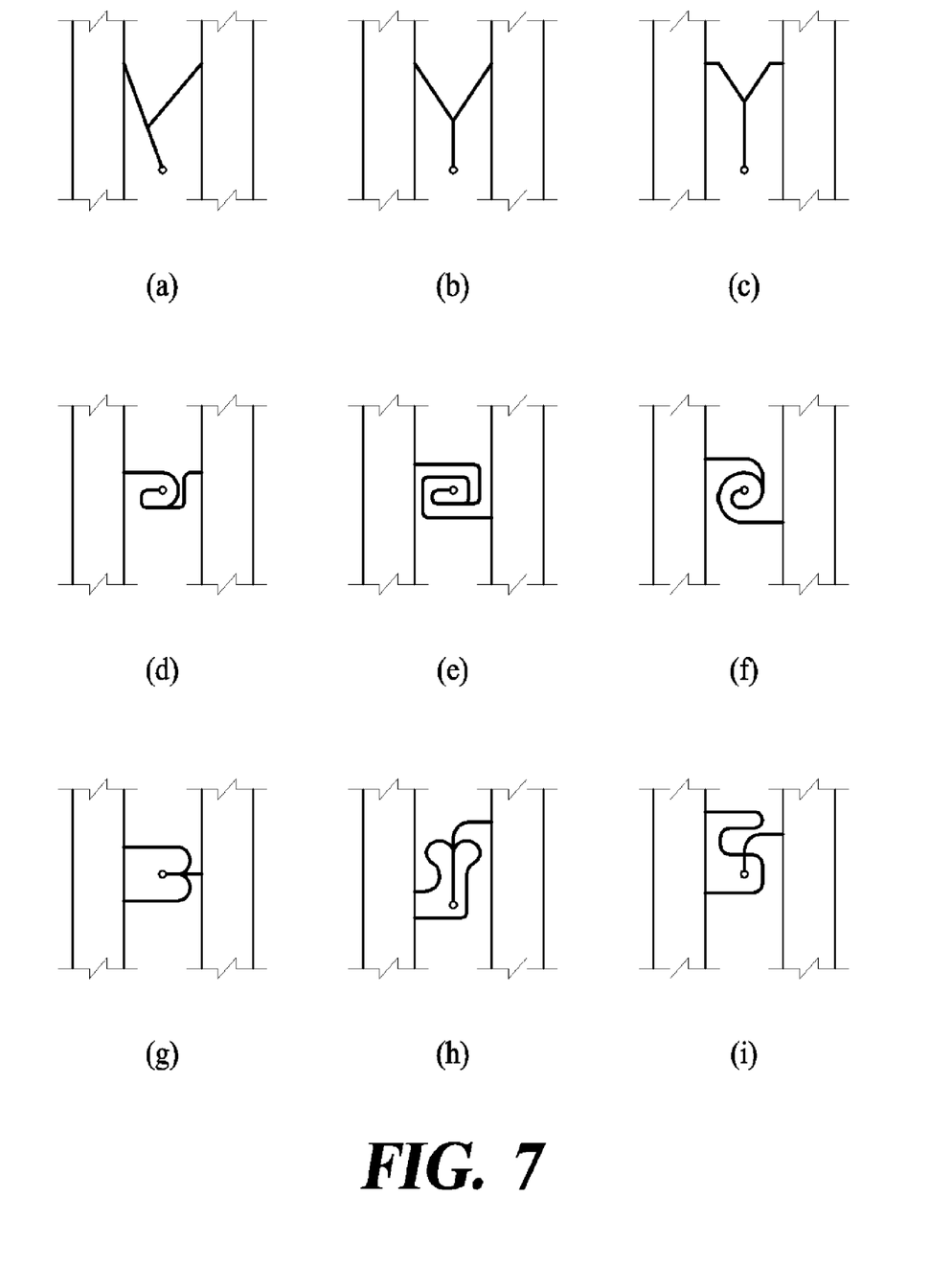
FIG. 7 is a set of conceptual diagrams illustrating examples of a microsphere formation part according to one embodiment of the present invention.

FIG. 7 is a set of conceptual diagrams illustrating examples of a microsphere formation part according to one embodiment of the present invention.

Referring to FIG. 7, the first, second, and third microchannels 1410, 1420, and 1412 may be implemented in various shapes as necessary in consideration of raw materials and process variables which are used for producing microspheres. A relative angle formed by the first and second microchannels 1410 and 1420 at the merge point 1414 may be formed in a range of 30° to 90° described above. In addition, referring to FIGS. 7G to 7I, one or more first microchannels 1410 may be withdrawn from the first supply line 1130 and connected to the merge point 1414 and thus may be formed such that the second raw material supplied to the second microchannel 1420 may be branched off from the left and right sides thereof by the first raw material supplied from the plurality of first microchannels 1410, thereby forming droplets. In addition, the third microchannel 1412 may be formed to have a greater width than each of the first and second microchannels 1410 and 1420 and thus have a greater cross-sectional area than each of the first and second microchannels 1410 and 1420.

Figure 8:
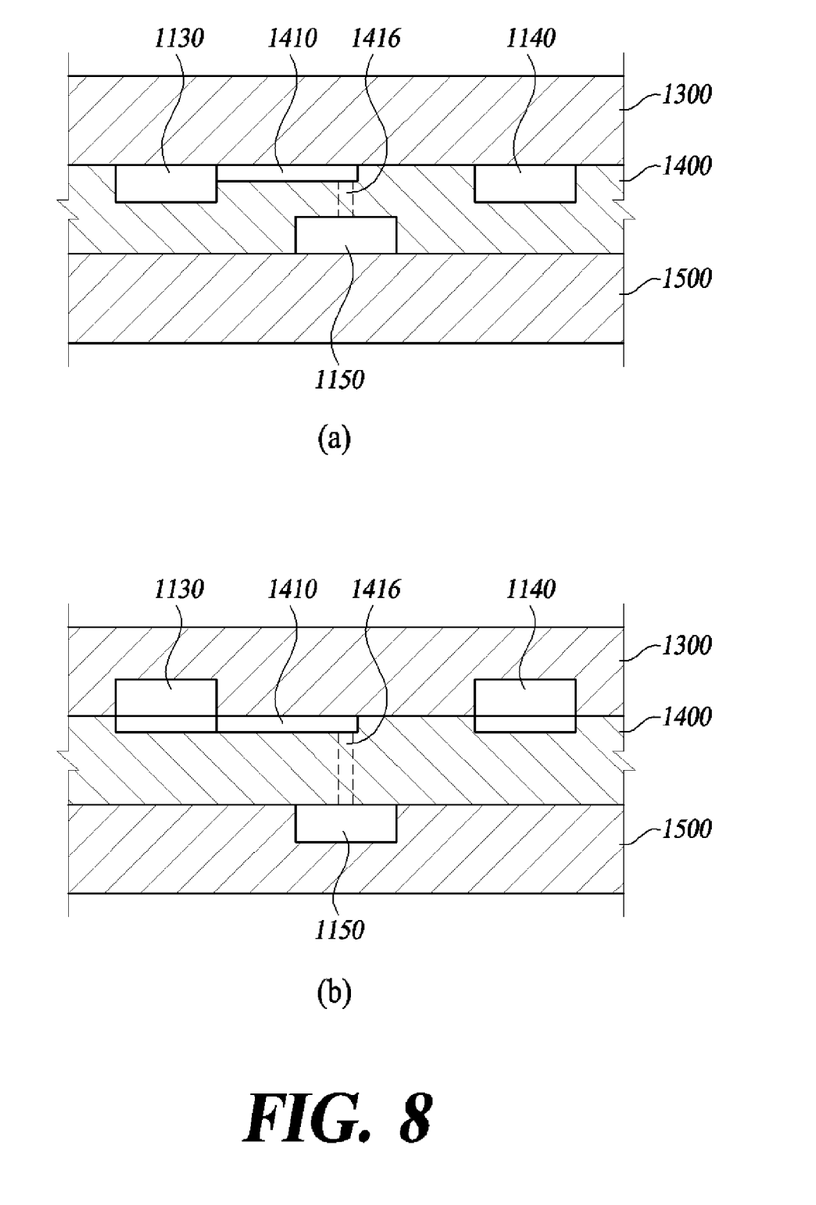
FIG. 8 is a set of conceptual diagrams illustrating a structure of supply lines and a discharge line according to one embodiment of the present invention.

FIG. 8 is a set of conceptual diagrams illustrating a structure of supply lines and a discharge line according to one embodiment of the present invention.

A case in which the supply lines 1130 and 1140 and the discharge line 1150 are formed on the central plate 1400 are illustrated in FIGS. 4 to 6 above. In this case, the supply lines and the discharge line 1150 should be formed to have a cross-sectional area or volume that is relatively greater than that of the microsphere formation parts such that a constant pressure acts on the plurality of microsphere formation parts. To this end, for example, each of the supply lines and the discharge line 1150 may be formed on a wafer so as to have a deeper depth and a wider width as compared with each of the microchannels constituting the microsphere formation part. However, the present invention is not limited thereto, and the supply lines and the discharge line 1150 may be formed over the central plate 1400 and the upper plate 1300 or the lower plate 1500.

For convenience and cost reduction in a process of forming a recess (or groove) structure in the central plate 1400, an etching depth of the supply lines and the discharge line 1150 may be formed at the same level as the microchannels. Instead, preferably, recess structures having the same shape may be formed at positions of a lower surface of the upper plate 1300 or an upper surface of the lower plate 1500, which correspond to the supply lines and discharge lines 1150 formed on the central plate 1400, thereby forming the supply lines and the discharge lines 1150 so as to have substantially a large cross-sectional area. In a state in which the multichannel microsphere producing unit 100 is assembled, the upper plate 1300, the central plate 1400, and the lower plate 1500 may be arranged in close contact with each other. FIG. 8 illustrates embodiments of the supply lines and the discharge lines 1150 according to the above-described contents.

Each of the first supply line 1130 and the second supply line 1140 may have a volume that is considerably greater than a size and flow rate of each of the plurality of first microchannels 1410 and the plurality of second microchannels 1420. Thus, a pressure inside the first supply line 1130 and the second supply line 1140 may be leveled off to be uniform throughout an entire area inside the first supply line 1130 and the second supply line 1140 and be constant during a process. Accordingly, a pressure of a fluid introduced from the first supply line 1130 or the second supply line 1140 to the plurality of first microchannels 1410 or the plurality of second microchannels 1420 may be maintained uniform and constant at relevant positions during a process.

In the illustrated embodiment, an example is described in which radially cut surfaces of the first supply line 1130 and the second supply line 1140 are substantially the same. However, the present invention is not limited thereto. For example, the first supply line 1130 and the second supply line 1140 may have the same cross-sectional area perpendicular to the length direction thereof, and the cross-sectional area of the second supply line 1140 may be smaller than the cross-sectional area of the first supply line 1130.

Referring again to FIGS. 4 and 5, the lower case 1200 may include a plate seating groove 1210 formed in the upper surface of the lower case 1200 and a product exhausting hole 1220 passing through the lower case 1200 at a central portion of the lower case 1200.

The plate seating groove 1210 may be formed in the upper surface of the lower case 1200 and may have a recess structure having a shape corresponding to an exterior of the upper plate 1300, the central plate 1400, and the lower plate 1500 which are to be seated thereon together. The plate seating groove 1210 may have an overall disk shape and may include a case-side alignment portion 1230 formed at one side of a circumferential area thereof. The case-side alignment portion 1230 may have a shape in which a partial area of a circumference of a circle is cut. The upper plate 1300, the central plate 1400, and the lower plate 1500 may also have a shape corresponding to a shape of the plate seating groove 1210 including the case-side alignment portion 1230, and thus, when the upper plate 1300, the central plate 1400, and the lower plate 1500 are seated on the plate seating groove 1210, the upper plate 1300, the central plate 1400, and the lower plate 1500 may be arranged with each other.

The product exhausting hole 1220 is formed in the lower case 1200 so that microspheres formed in the multichannel microsphere producing unit 100 are collected and discharged through the product exhausting hole 1220. The product exhausting hole 1220 may be connected to the product discharge portion attached to a lower surface of the lower case 1200. A product discharge pipe 1610 may be in fluid communication with the product exhausting hole 1220 of the lower case 1200. The product discharge pipe 1610 may extend to the product storage tank 600 and may collect microspheres formed in the multichannel microsphere producing unit 100 to transfer the formed microspheres to the product storage tank 600.

An exterior and dimensions of the upper plate 1300 may correspond to an exterior and dimensions of the plate seating groove 1210 of the lower case 1200 on which the upper plate 1300 is to be seated. In one embodiment of the present invention, an upper plate-side alignment portion 1330 of the upper plate 1300 may be fitted into the case-side seating groove 1210 of the lower case 1200.

The upper plate 1300 may be made of a rigid material that is moldable with high dimensional accuracy, for example, a silicon wafer, a glass wafer, or PDMS. In particular, in one embodiment of the present invention, the upper plate 1300 may be made of a glass wafer. In one embodiment of the present invention, since a plurality of first channel connection holes 1310 and a plurality of second channel connection holes 1320 have a relatively simple structure, the upper plate 1300 may be suitably made of glass having toughness that is higher than that of a silicon wafer.

An exterior and dimensions of the lower plate 1500 may correspond to the exterior and dimensions of the plate seating groove 1210 of the lower case 1200 on which the lower plate 1500 is to be seated. The lower plate 1500 may be made of the same material as the upper plate. In one embodiment of the present invention, a lower plate 1500-side alignment portion of the lower plate 1500 may be fitted into the case-side alignment portion 1230 of the lower case 1200. Like the upper plate 1300 and the lower plate 1500, the central plate 1400 may also have an alignment portion corresponding to the exterior and dimensions of the seating groove 1210.

A dispersed phase is generated at the merge point 1414 of a biodegradable polymer-phase solution and a water-phase solution. Thereafter, the dispersed phase including microsphere droplets formed at the merge point 1414 flows to be discharged through a discharge path and collected in a receiver solution, and the receiver solution is maintained in a dispersed phase at room temperature of 25° C. for about 24 hours to extract dichloromethane from the receiver solution. As a result, a water-phase solution including biodegradable polymer-based microsphere droplets is obtained. The microsphere droplets are separated from the water-phase solution through filtration processes. Microspheres including biodegradable polymers are finally obtained by washing the microsphere droplets to remove the remaining polyvinyl alcohol and dichloromethane solution and then performing a drying process (see FIG. 1).

In the present invention, the biodegradable polymer-based microsphere droplets formed at the merge point 1414 are collected in a receiver including a receiver solution with a surfactant. Here, since the receiver solution with the surfactant is used, the biodegradable polymer-based microsphere droplets are prevented from coagulating.

The biodegradable polymer-based microsphere droplets collected in such an operation are first dried in a temperature range of 0° C. to 50° C. and preferably in a temperature range of 20° C. to 25° C. When an emulsion in a droplet form is maintained at a temperature below a boiling point of an organic solvent for a predetermined time, for example, a period of 12 hours to 48 hours, an organic solvent therein is extracted from the droplets, and thus, microspheres are formed though a solidification process.

Biodegradable polymer-based microspheres formed in such an operation are filtered and then cleaned with purified water at least once and preferably one to three times to remove the remaining surfactant and solvent. Thereafter, a filtering process is performed once again. A cleaning process may be repeated until the remaining surfactant and the solvent are completely removed.

In one embodiment of the present invention, another process is performed after such an operation, and a used drying method is not particularly limited. However, although the used drying method is not particularly limited, it is preferable that a freeze drying or vacuum drying method is used for the microspheres to minimize heat damage to a biodegradable polymer included in the microspheres.

The invention claimed is:

1. A multichannel microsphere producing unit comprising:
   a central plate;
   an upper plate disposed above the central plate;
   a lower plate disposed below the central plate;
   a first supply line, a second supply line, and an inlet of a discharge line, which are disposed between the central plate and the upper plate and to which a first raw material, a second raw material, and a third raw material are respectively supplied as solutions;
   a microsphere formation part which is disposed in the central plate and includes one or more first microchannels including one end portion in fluid communication with the first supply line, a second microchannel including one end portion in fluid communication with the second supply line, one or more merge points at which the other end portion of the first microchannel and the other end portion of the second microchannel are connected to be in fluid communication with each other so that separate droplets are formed, and one or more third microchannels which include one end portion in fluid communication with the one or more merge points and in which the separated droplets are formed into microspheres; and
   an outlet of the discharge line which is disposed between the central plate and the lower plate, and discharges the microspheres,
   wherein the discharge line includes a first discharge line, a second discharge line, and a plurality of microholes passing through the central plate to be in fluid communication with the other end portions of the one or more third microchannels, and is formed to collect the microspheres and discharge the microspheres through the outlet,
   wherein shapes of the first supply line, the first discharge line, the second supply line, and the second discharge line in a plan view are rolled-up shapes which are sequentially disposed in parallel so as to be spaced from each other and are wound in a plurality of turns, and
   the microsphere formation part is provided as a plurality of microsphere formation parts disposed along the first discharge line and the second discharge line.

2. The multichannel microsphere producing unit of claim 1, wherein the first raw material is a water-phase solution, and
   the second raw material is a polymer-phase solution.

3. The multichannel microsphere producing unit of claim 1, wherein inlets of the first discharge line and the second discharge line are merged to be in fluid communication with each other, and
   outlets of the first discharge line and the second discharge line are merged to be in fluid communication with each other.

4. The multichannel microsphere producing unit of claim 1, wherein each of the first, second, and third microchannels of the microsphere formation part is formed to have a cross-sectional area that is in a range of 100% to 200% of a cross-sectional area of each of the microspheres.

5. The multichannel microsphere producing unit of claim 1, wherein each of the first, second, and third microchannels of the microsphere formation part has a cross section of any one of a circular shape and a square shape of which a width and a depth are the same, and
   the width of the square shape or a diameter of the circular shape is in a range of 100% to 200% of a diameter of the formed microspheres.

6. The multichannel microsphere producing unit of claim 1, wherein an angle formed by the first microchannel and the second microchannel at the merge point is in a range of 30° to 90°.

7. The multichannel microsphere producing unit of claim 1, wherein each of the first, second, and third microchannels has a rectangular cross section, each of the microholes has a cylindrical shape, and
a circular cross-sectional area of each of the microholes is greater than or equal to a cross-sectional area of the third microchannel.

8. The multichannel microsphere producing unit of claim 7, wherein the cross-sectional area of the third microchannel is greater than or equal to a cross-sectional area of each of the first and second microchannels.

9. The multichannel microsphere producing unit of claim 1, wherein the first and second supply lines are formed to have recess structures by being divided on the upper surface of the central plate and a lower surface of the upper plate, and
a depth of the recess structure formed in the upper surface of the central plate is the same as a depth of each of the first and second microchannels.

10. The multichannel microsphere producing unit of claim 1, wherein the inlet of the discharge line is formed to have recess structures by being divided on a lower surface of the central plate and an upper surface of the lower plate.

11. The multichannel microsphere producing unit of claim 1, wherein the outlet of discharge line is formed to have a recess structure in an upper surface of the lower plate.

* * * * *